June 3, 1958          H. N. ROSS          2,837,286
TEMPERATURE AND HUMIDITY CONTROL SYSTEM
Filed Sept. 13, 1956
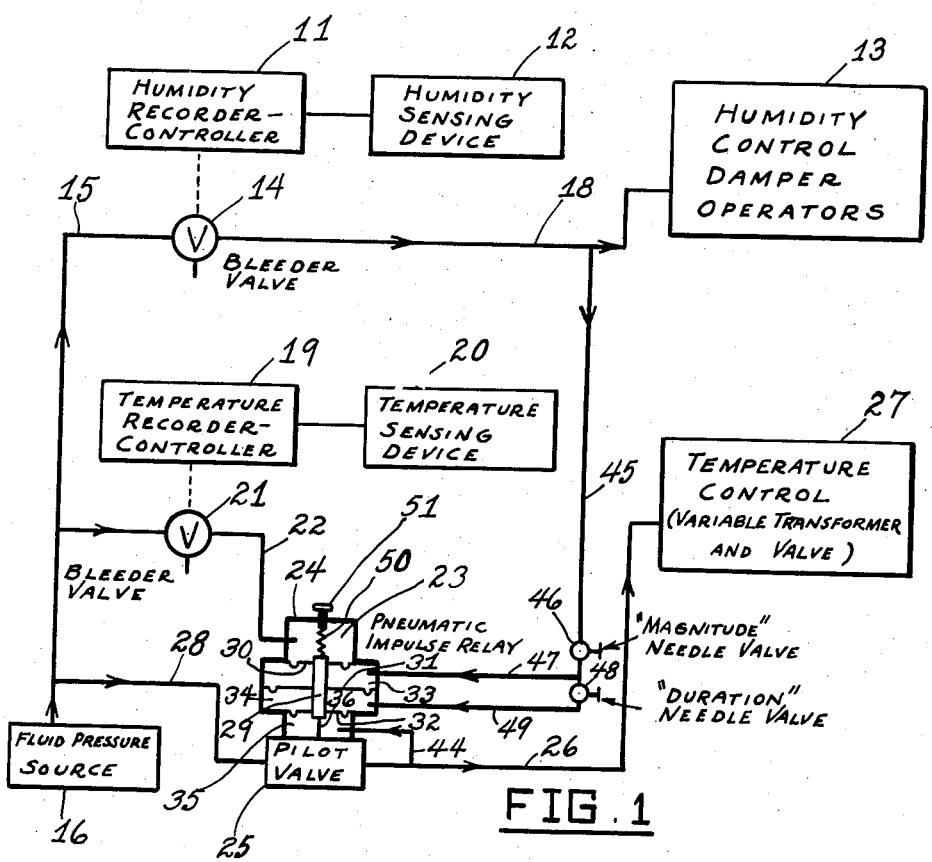
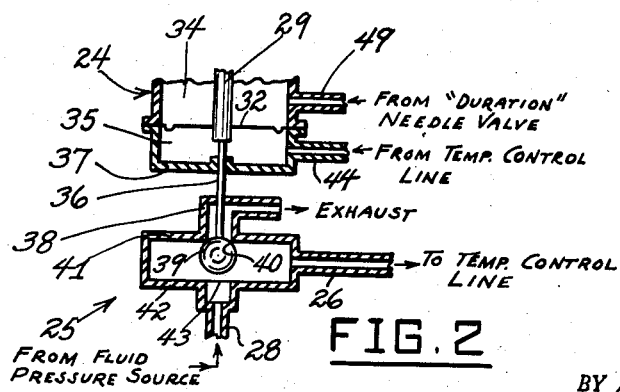
INVENTOR.
HUGH N. ROSS
BY Herman L. Gordon
ATTORNEY

United States Patent Office 2,837,286
Patented June 3, 1958

2,837,286

TEMPERATURE AND HUMIDITY CONTROL SYSTEM

Hugh N. Ross, Silver Spring, Md., assignor to American Instrument Company, Inc., Silver Spring, Md.

Application September 13, 1956, Serial No. 609,776

15 Claims. (Cl. 236—44)

This invention relates to temperature-humidity control systems, and more particularly to a system for decreasing or eliminating changes in temperature in an area being supervised when the operating humidity in said area is changed suddenly.

A main object of the invention is to provide a novel and improved system for simultaneously controlling the temperature and humidity of an area or space, said system being provided with means for decreasing or eliminating changes in temperature in the area or space being supervised when the operating humidity is changed suddenly or when the moisture load of a process being supervised by the system changes suddenly.

A further object of the invention is to provide an improved system for accurately controlling the temperature of a space to prevent temperature changes in said space when the humidity therein suddenly changes, the system being arranged so that it decreases the tendency of the conditions (temperature and humidity) in said space to oscillate due to interaction of the temperature and humidity control functions.

A still further object of the invention is to provide an improved humidity-temperature control system for a space to be supervised, said system including means to prevent undesired temperature changes in the space when the humidity is suddenly changed therein, said means operating in response to the change in humidity to automatically introduce a compensating action on the temperature-controlling means of the system to counterbalance the tendency toward transient temperature variations in said space produced by the changes in humidity.

A still further object of the invention is to provide a novel and improved relay device suitable for use in any fluid pressure system wherein the pressure in one portion of the system must be temporarily varied in a special manner in response to a rapid change in pressure in another portion of the system.

Further objects and advantages of the invention will become apparent from the following description and claims, and from the accompanying drawings, wherein:

Figure 1 is a schematic block diagram illustrating the conduit connections of an improved temperature-humidity control system according to the present invention.

Figure 2 is a diagrammatic cross-sectional view taken vertically through the pilot valve and a fragmentary portion of the impulse relay, as employed in the system shown in Figure 1.

Referring to the drawings, and more particularly to Figure 1, 11 designates a conventional humidity recorder and controller, which is actuated by a suitable conventional humidity-responsive device 12 located in the space to be supervised.

The recorder-controller 11 may be of the electrical type, and the sensing device 12 may be of the type comprising a pair of bifilar windings mounted on an insulating form and provided with a hygroscopic coating of moisture-responsive conductive material, such as lithium chloride, or the like, the sensing device 12 being electrically connected to the recorder-controller 11 so as to provide an electrical signal responsive to a humidity change from a reference condition.

The recorder-controller 11 preferably is of the type provided with an indicator showing the instantaneous value of relative humidity and with recording means, including a chart and scale, showing the variations in relative humidity with time. Operatively coupled to the recorder-controller 11 is a control valve 14, connected in a conduit 15 between a source of fluid pressure 16 and a humidity control device 13, such as a suitable pressure-responsive damper operating mechanism. The damper operating mechanism responds to changes in pressure in the output conduit 18, leading from the valve 14, to admit more or less moisture into the space being supervised, so as to maintain the humidity therein at a specified desired value.

The valve 14 may be of a bleeder type similar to the pneumatic controller, Model 1RB565C made by Bristol Co., Waterbury, Conn. This valve has a proportional and automatic reset action and is electrically controlled by the recorder-controller 11. The valve 14 regulates the pressure in the output line 18 in proportion to the deviation of the measured humidity from the desired humidity. Source 16 may be a suitable reservoir containing compressed air at a suitable pressure, for example, 25 pounds per square inch, and the valve 14 may be designed to regulate the pressure in line 18 so that said pressure varies from about 3 pounds per square inch to about 17 pounds per square inch, depending upon the deviation of the measured humidity from the "set point," or desired relative humidity. This output pressure is determined by the action of recorder-controller 11. The output pressure in line 18 operates the damper control device 13, causing more or less humidifying action, to return the conditions in the controlled space to the set point. The device 13 may be a dehumidifying apparatus, responding to the pressure in line 18 to provide more or less dehumidifying action, to maintain the controlled space at the desired value of relative humidity.

Designated at 19 is a temperature recorder and controller, operated by a temperature-responsive device 20 in the controlled space, for example, a thermistor or other electrical temperature-sensing means, which is coupled to a control valve 21 similar to control valve 14, to control the output pressure in a conduit 22 connected between fluid pressure supply line 15 and the upper chamber 23 of a pneumatic impulse relay 24. Impulse relay 24 controls a pilot valve 25 in a manner to be presently described, to control the pressure in an output conduit 26 which is controllingly connected to a pressure-responsive temperature control device 27. As shown, a fluid pressure supply conduit 28 is connected between conduit 15 and pilot valve 25.

Axially mounted in impulse relay 24 is a plunger 29 secured centrally to a flexible diaphragm 30 exposed at its upper face to chamber 23. Plunger 29 is secured centrally to spaced flexible diaphragms 31 and 32 in relay 24 below diaphragm 30, defining the upper auxiliary space 33, the lower auxiliary space 34, and the bottom space 35 in said impulse relay.

As shown, the intermediate cross-section of relay 24 containing diaphragm 31 is relatively large, as compared with that of upper space 23 and bottom space 35, and diaphragm 31 is correspondingly larger than diaphragms 30 and 32.

Axially secured to plunger 29 is a rod element 36 which extends slidably and sealingly through the bottom wall 37 of impulse relay 24 and which extends slidably and sealingly into the pilot valve 25 through an upper vertical conduit 38 thereof. Conduit 38 is vented to atmosphere, as shown in Figure 2. A valve ball 39 is secured to the bottom end of rod 36 and is movable toward and away from the annular valve seat 40 defined at the junction of conduit 38 with the top wall 41 of pilot valve 25. Connected to the bottom wall 42 of the pilot valve opposite ball 39 is the fluid input conduit 28, and provided at the connection is an annular valve seat 43 aligned with rod 36, whereby movement of the valve ball 39 between valve seats 40 and 43 provides a throttling action, regulating the relative amount of fluid bled from exhaust conduit 38, and regulating the output pressure in conduit 26.

A feedback conduit 44 connects conduit 26 to the bottom space 35 in impulse relay 24, whereby the lower diaphragm 32 is constantly exposed to the output pressure in conduit 26.

Normally, ball 39 will be held in a stable position, depending upon the difference in fluid pressures in chambers 23 ad 35, and will respond to changes in said pressure differential produced by variations in temperature in the controlled space, to vary the output pressure in conduit 26. This acts on the pressure-responsive temperature controller 27 to change the heat input to said space to maintain the temperature therein at a desired set point.

The device 27 may be any conventional pressure-responsive heat controller, such as a pneumatically controlled variable transformer connected between a source of alternating current and a heater winding, or between a source of alternating current and an electromagnetic valve in a steam heating system. Alternatively, the device 27 may be employed to control a refrigeration system, wherein the demand for refrigeration is provided by the impulse relay 24 and pilot valve 25 in response to the changes in temperature in the space being supervised.

A conduit 45 is connected to the humidity control conduit 18 and is connected through a manually adjustable needle valve 46 to a conduit 47. Conduit 47 is connected to the upper auxiliary space 33 in impulse relay 24. Conduit 45 is connected through needle valve 46 and a second manually adjustable needle valve 48 to a conduit 49. Conduit 49 is connected to the lower auxiliary space 34 in impulse relay 24.

Without the impulse relay connections to line 18, and with chambers 33 and 34 at equal pressures, the air temperature would drop suddenly when the air is dehumidified, as by refrigeration or would rise suddenly when the air is humidified, as by admitting moist warm air or steam. The impulse relay is however connected to line 18 by the conduit 45, which communicates with chamber 33 through the restriction device 46 and with chamber 34 through restriction device 48. Therefore, because of the temporary pressure differential produced between chambers 33 and 34 as a result of a sudden change in pressure in line 18, the impulse relay, in response to the humidity change, corrects the heating or cooling action in such a direction as to counteract the temperature change, before the temperature recorder-controller 19 and the temperature-responsive element 20 sense the incorrect temperature. Then, as the pressures equalize in chambers 33 and 34, the effect of the impulse relay action decreases to zero gradually, returning the temperature control to the temperature recorder-controller 19.

In the absence of any sudden change in humidity in the space being supervised, and therefore in the absence of any sudden change in pressure in line 18, the pressures in spaces 33 and 34 are balanced, so that diaphragm 31 does not interfere with the normal action of the impulse relay 24, which is to cause pilot valve 25 to provide temperature control action in accordance with the response of the temperature recorder-controller 19.

A biasing force K may be imposed on the plunger 29 by the provision of a coiled spring 50 in chamber 23 secured between the top end of the plunger and an adjusting screw 51, as diagrammatically shown in Figure 1. Thus, the output pressure T in conduit 26 is given by $$T = A + (B - C) + K$$

where A is the force on plunger 29 from the pressure in chamber 23, B is the force on plunger 29 from the pressure in chamber 33, and C is the force on plunger 29 from the pressure in chamber 34.

The biasing force K may be adjusted to zero, or may be made slightly positive or negative as required. Assuming K to be zero, $$T = A + (B - C)$$

When the pressures in chambers 33 and 34 are equal, $B = C$, and therefore $T = A$.

During impulse action, namely, when the pressure in conduit 18 changes suddenly, the forces B and C are in accordance with the pressures in chambers 33 and 34 and are determined by the pressure in conduit 18 and the restrictions defined by the needle valves 46 and 48.

The first adjustable needle valve 46 controls the magnitude of the change in heating or cooling action caused by a change in the humidity damper system. The second adjustable needle valve 48 controls the length of time required for the impulse to decrease to zero.

Obviously, the pneumatic relay device comprising pilot valve 25, the impulse relay 24 operatively connected thereto, and the needle valves 46 and 48 may be employed in other systems than that specifically described herein, and may be employed in any fluid pressure system wherein the pressure in one fluid line or other portion of the system must be temporarily varied in a special manner in response to a rapid change in pressure in another fluid line or other portion of the system.

While a specific embodiment of an improved temperature-humidity control system has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a humidity and temperature control system, humidity-sensing means, humidity-modifying means, means controllingly connecting said humidity-sensing means to said humidity-modifying means, temperature-sensitive means, temperature modifying means, means controllingly connecting said temperature-sensitive means to said temperature-modifying means, and means connected to said humidity-sensing means and being formed and arranged to operate said temperature-modifying means only in response to a relatively rapid change in humidity, and independently of said temperature-sensitive means.

2. In a humidity and temperature control system, humidity-sensitive means, humidity-modifying means, means controllingly connecting said humidity-sensitive means to said humidity-modifying means, temperature-sensitive means, temperature-modifying means, means controllingly connecting said temperature-sensitive means to said temperature-modifying means, and means connected to said humidity-sensitive means and being formed and arranged to operate said temperature-modifying means for a predetermined period of time independently of said temperature-sensitive means only in response to a relatively rapid change in humidity.

3. In a humidity and temperature control system, humidity-sensitive means, humidity-modifying means, means controllingly connecting said humidity-sensitive means to said humidity-modifying means, temperature-sensitive means, temperature-modifying means, means controllingly connecting said temperature-sensitive means to said temperature-modifying means, relay means connected between said humidity-sensitive means and said temperature-sensitive means and being formed and arranged to operate only in response to a relatively rapid change in humidity, and means operatively coupling said relay means to said temperature-modifying means.

4. In a system for controlling the humidity and temperature in a space, humidity-sensitive means in said space, humidity-modifying means connected to said humidity-sensitive means and being formed and arranged to normally maintain a predetermined humidity in said space, temperature-sensitive means in said space, temperature-modifying means connected to said temperature-sensitive means and being formed and arranged to normally maintain a predetermined temperature in said space, and means connected to said humidity-sensitive means and being formed and arranged to control said temperature-modifying means for a predetermined period of time independently of said temperature-sensitive means only in response to a relatively rapid change of humidity in said space.

5. In a system for controlling the humidity and temperature in a space, humidity-sensitive means in said space, humidity-modifying means connected to said humidity-sensitive means and being formed and arranged to normally maintain a predetermined humidity in said space, temperature-sensitive means in said space, temperature-modifying means connected to said temperature-sensitive means and being formed and arranged to normally maintain a predetermined temperature in said space, and means formed and arranged to control said temperature-modifying means at times only in response to a relatively rapid change in humidity in said space, said last-named means comprising a humidity-responsive relay device connected to said humidity-sensitive means, means operatively coupling said relay device to said temperature-modifying means and being formed and arranged to vary the temperature in a direction opposite to the direction of said rapid change in humidity, means to actuate said relay device only in response to said rapid change in humidity, and means terminating operation of said relay device at the end of a predetermined time period.

6. In a system for controlling humidity and temperature in a space, a pressure-responsive humidity control device, a first fluid pressure line controllingly connected to said device, means to vary the pressure in said line in accordance with the humidity in said space, a pressure-responsive temperature control device, a second fluid pressure line controllingly connected to said temperature control device, means to vary the pressure in said second line in accordance with the temperature in said space, and means responsive to a relatively rapid change in pressure in said first fluid pressure line formed and arranged to vary the pressure in said second fluid pressure line for a predetermined time in accordance with said change in pressure in a manner to counteract temperature changes in said space caused by rapid changes in humidity therein.

7. In a system for controlling humidity and temperature in a space, a pressure-responsive humidity-modifying device, a first fluid pressure line controllingly connected to said device, means varying the pressure in said line in accordance with the humidity in said space, a pressure-responsive temperature-modifying device, a second fluid pressure line controllingly connected to said temperature-modifying device, means normally varying the pressure in said second line in accordance with the temperature in said space, and means to temporarily change the pressure in said second line responsive to a relatively rapid change in humidity in said space.

8. In a system for controlling humidity and temperature in a space, a pressure-responsive humidity-modifying device, a first fluid pressure line controllingly connected to said device, means varying the pressure in said line in accordance with the humidity in said space, a pressure-responsive temperature-modifying device, a second fluid pressure line controllingly connected to said temperature-modifying device, means normally varying the pressure in said second line in accordance with the temperature in said space, and means to temporarily change the pressure in said second line responsive to a relatively rapid change in humidity in said space in a direction opposite to the direction of the change in pressure in said first line produced by the change in humidity in said space.

9. In a system for controlling humidity and temperature in a space, a pressure-responsive humidity-modifying device, a first fluid pressure line controllingly connected to said device, means varying the pressure in said line in accordance with the humidity in said space, a pressure-responsive temperature-modifying device, a second fluid pressure line controllingly connected to said temperature-modifying device, means normally varying the pressure in said second line in accordance with the temperature in said space, and a relay device connected between said lines and being formed and arranged to temporarily change the pressure in said second line responsive to a relatively rapid change of pressure in said first line and in a direction opposite to that of the change in pressure in said first line.

10. In a system of the character described, a first fluid pressure line, means varying the pressure in said line in accordance with the humidity in a space to be supervised, a second fluid pressure line, means normally varying the pressure in said second line in accordance with the temperature in said space, and means temporarily varying the pressure in said second line responsive to a relatively rapid change in pressure in said first line and in a direction opposite to that of said rapid change.

11. In a system of the character described, a first fluid pressure line, means varying the pressure in said line in accordance with the humidity in a space to be supervised, a second fluid pressure line, a pilot valve in said second line formed and arranged to vary the pressure therein, means actuating said pilot valve in accordance with the temperature in said space, relay means operatively connected to said pilot valve, and means interconnected between said relay means and said first line and being formed and arranged to temporarily actuate said relay means responsive to a relatively rapid change in pressure in said first line, said relay means being formed and arranged to vary the pressure in said second line in a direction opposite to that of said rapid change.

12. In combination, a first fluid pressure line, a second fluid pressure line, a pilot valve in said second line formed and arranged to vary the pressure therein, an impulse relay comprising a casing, first, second and third flexible diaphragms mounted in said casing and defining first, second, third and fourth chambers adjacent thereto in said casing, a common operating element connected to said diaphragms and operatively connected to said pilot valve, conduit means connecting said second line to said fourth chamber, a first variable fluid pressure source connected to said first chamber, a second variable fluid pressure source connected to said first line, conduit means including a first restriction connecting said first line to said second chamber, and conduit means including a second restriction connecting said second chamber to said third chamber, whereby a rapid change in pressure in said first line temporarily produces a pressure differential between said second and third chambers and actuates said common operating element.

13. In combination, a first fluid pressure line, a second fluid pressure line, a pilot valve in said second line formed and arranged to vary the pressure therein, an impulse relay comprising a casing, first, second and third flexible diaphragms mounted in said casing and defining first, second, third and fourth chambers adjacent thereto in said casing, a common operating element connected to said diaphragms and operatively connected to said pilot valve, conduit means connecting said second line to said fourth chamber, a temperature-responsive fluid pressure source connected to said first chamber, a humidity-responsive fluid pressure source connected to said first line, conduit means including a first restriction connecting said first line to said second chamber, and conduit means including a second restriction connecting said second chamber to said third chamber, whereby a rapid change in pressure in said first line temporarily produces a pressure differential between said second and third chambers and actuates said common operating element.

14. A pneumatic relay device of the character described comprising a pilot valve adapted to be controllingly connected in a fluid pressure line, a casing including first, second and third spaced flexible diaphragms defining first, second, third and fourth chambers adjacent thereto in said casing, a common operating element connected to said diaphragms and operatively connected to said pilot valve, means to connect said first chamber to a first variable source of fluid pressure, conduit means, including a first restriction, connected to said second chamber and being adapted to connect said second chamber to a second variable source of fluid pressure, further conduit means, including a second restriction, interconnecting said second and third chambers, and means to connect said fourth chamber to said fluid pressure line.

15. In a humidity and temperature control system, humidity-sensitive means, humidity-modifying means, means controllingly connecting said humidity-sensitive means to said humidity-modifying means, temperature-sensitive means, temperature-modifying means, means controllingly connecting said temperature-sensitive means to said temperature-modifying means, relay means connected to said humidity-sensitive means and being formed and arranged to operate only in response to a relatively rapid change in humidity, and means controllingly connecting said relay means to said temperature-modifying means.

References Cited in the file of this patent

UNITED STATES PATENTS 2,204,016   Karlson _____ June 11, 1940